United States Patent
Volkers et al.

(10) Patent No.: US 6,504,000 B1
(45) Date of Patent: *Jan. 7, 2003

(54) PROCESS FOR PREPARING POLYCARBONATE

(75) Inventors: Andre Volkers, ET Wouw (NL); Marcel Puyn, AM Swolgen (NL)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/682,410

(22) Filed: Aug. 30, 2001

(51) Int. Cl.$^7$ ............................................... C08G 64/00
(52) U.S. Cl. ...................................... 528/196; 528/198
(58) Field of Search .................................. 528/196, 198

(56) References Cited

U.S. PATENT DOCUMENTS

| | | | |
|---|---|---|---|
| 4,217,438 A | 8/1980 | Brunelle et al. | 528/202 |
| 4,401,804 A | 8/1983 | Wooten et al. | 528/272 |
| 4,532,290 A | 7/1985 | Jaquiss et al. | 524/417 |
| 5,210,268 A | 5/1993 | Fukuoka et al. | 558/270 |
| 5,306,801 A | 4/1994 | Sakashita et al. | 528/198 |
| 5,319,066 A | 6/1994 | King, Jr. | 528/199 |
| 5,354,791 A | 10/1994 | Gallucci | 523/466 |
| 5,371,170 A | 12/1994 | Sakashita et al. | 528/198 |
| 5,496,921 A | 3/1996 | Sakashita et al. | 528/487 |
| 5,606,007 A | 2/1997 | Sakashita et al. | 528/176 |
| 5,608,027 A | 3/1997 | Crosby et al. | 528/51 |
| 5,717,057 A | 2/1998 | Sakashita et al. | 528/198 |
| 5,834,615 A | 11/1998 | Nishihira et al. | 558/274 |
| 5,922,816 A | 7/1999 | Hamilton | 525/446 |
| 5,942,594 A | 8/1999 | Nakae et al. | 528/196 |
| 6,177,536 B1 | 1/2001 | Anamizu et al. | 528/196 |

FOREIGN PATENT DOCUMENTS

| | | |
|---|---|---|
| JP | 9059371 | 3/1997 |

*Primary Examiner*—Terressa M. Boykin

(57) ABSTRACT

A method for preparing polycarbonates by melt polycondensation of a dihydroxy compound and a diarylcarbonate compound in the presence of an alkaline catalyst is described. A branching quencher compound is added to an intermediate polycarbonate produced by the melt polycondensation reaction in an amount effective to inhibit or prevent the formation of branching species during a subsequent finishing process. Adding the branching quencher compound to the product of the melt polycondensation reaction produces finished polycarbonates with reduced branching species, high ductility and impact strength.

17 Claims, 2 Drawing Sheets

PROCESS FOR PREPARING POLYCARBONATE

BACKGROUND OF INVENTION

This disclosure relates to a manufacturing method for preparing polycarbonates, and more particularly, to a manufacturing method for preparing polycarbonates by catalytic melt polycondensation of a dihydroxy compound and a diaryl carbonate in the presence of a catalyst.

Aromatic polycarbonates are used in a variety of applications due to their excellent mechanical and physical properties including, among others, impact and heat resistance, strength and transparency. There are three general processes known for the commercial manufacture of aromatic polycarbonates, which are illustrated in FIG. 1. The conventional interfacial processes, as shown in FIG. 1A, and the phosgene-based melt process, as shown in FIG. 1B, start with the reaction of phosgene with carbon monoxide. The third general process, a "no phosgene" melt process as shown in FIG. 1C, was developed to eliminate the use of highly toxic phosgene in the process flow. Of these general methods, the "no phosgene" melt process shown is preferred since it prepares polycarbonates less expensively than the interfacial process and avoids the use of highly toxic phosgene. The third process is generally referred to in the art as a melt polycondensation process or transesterification process.

Both types of melt processes shown in FIGS. 1B, and 1C make use of a diarylcarbonate, such as diphenylcarbonate (DPC) as an intermediate, which is polymerized with a dihydric phenol such as bisphenol A (BPA) in the presence of an alkaline catalyst, such as sodium hydroxide, to form a polycarbonate in accordance with the general reaction scheme shown in FIG. 2. This polycarbonate may be extruded or otherwise processed, and may be combined with additives such as dyes and UV stabilizers. Typically, after the initial reaction, the reactor containing the polycarbonate thus obtained is heated and/or reduced in pressure to increase the molecular weight of the polycarbonate and obtain the desired properties in the finished polycarbonate. Once the target properties are obtained, the heating and/or reduction in pressure is discontinued.

In many cases, however, the alkaline catalyst used for the transesterification reaction causes the formation of a cross-linking moiety that results in the production of a branched polycarbonate structure during the heating and/or reduction of pressure. The production of branching species deleteriously influences the mechanical and physical properties of the finished polycarbonate. Thus, it is desirable to repress the formation of the cross-linking moieties caused by the alkaline catalyst to minimize or prevent the formation of branching species in the finished polycarbonate.

SUMMARY OF INVENTION

A process for the production of a polycarbonate having reduced branching species includes melt polycondensing an aromatic dihydroxy compound and a diarylcarbonate in the presence of an alkaline catalyst in a reactor to produce an intermediate polycarbonate. A branching quencher compound is then added to the intermediate polycarbonate prior to finishing. The molecular weight of the polycarbonate can then increased to obtain a targeted molecular weight by heating and/or reducing the pressure in the reactor, wherein the amount of branching quencher compound added to the polycarbonate is effective to reduce the amount of branching species generated during the heating and/or reduction in pressure.

These and other features will become better understood from the detailed description that is described in conjunction with the accompanying drawings.

BRIEF DESCRIPTION OF DRAWINGS

Referring now to the figures, which are meant to be illustrative, not limiting.

DETAILED DESCRIPTION

Figure 1A:
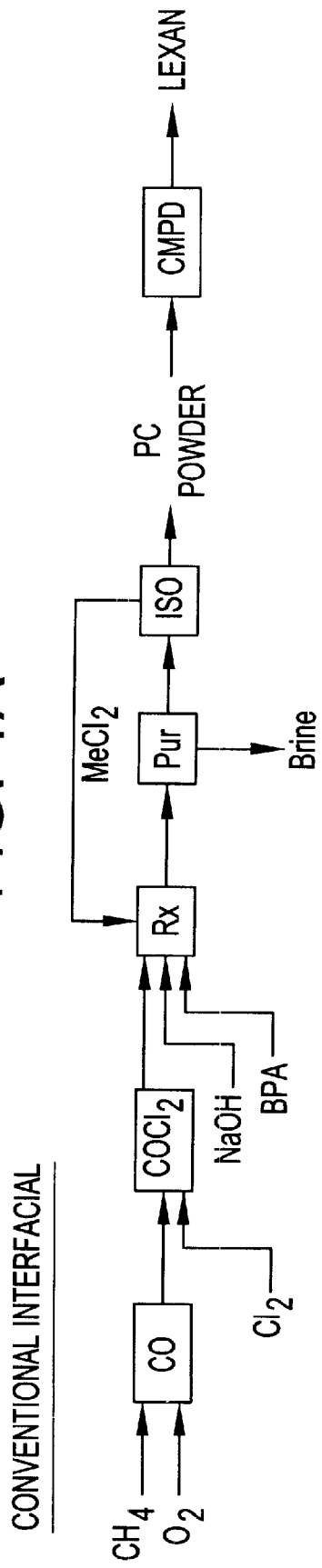
FIG. 1 illustrates three prior art processes for the production of polycarbonate.
Figure 1B:
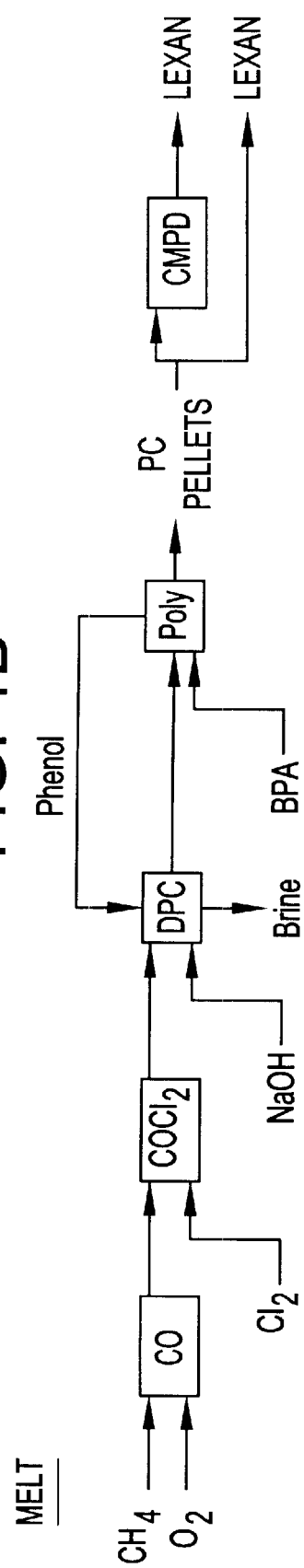
Figure 1C:
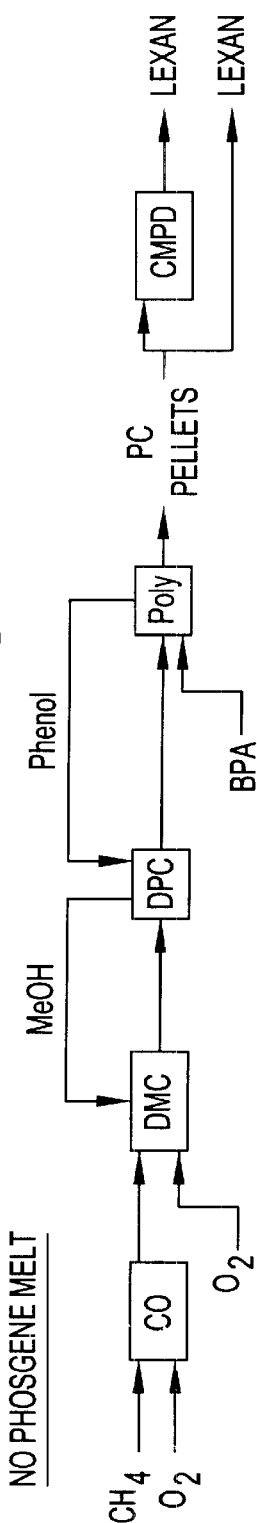
Figure 2:
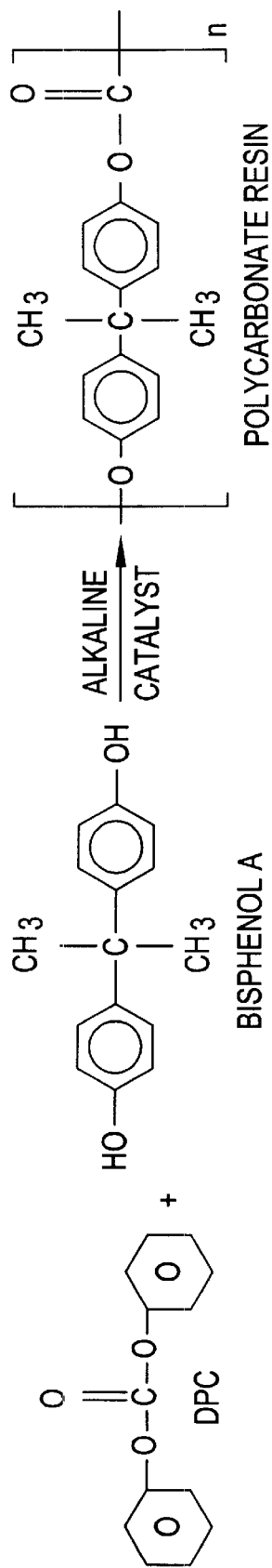
FIG. 2 illustrates a process for preparing polycarbonate.

A method for preparing polycarbonates by melt polycondensation of a dihydroxy compound and a diarylcarbonate compound in the presence of an alkaline catalyst is described. A branching quencher compound is added to an intermediate polycarbonate produced by the melt polycondensation reaction in an amount effective to inhibit or prevent the formation of branching species during a subsequent finishing process. Adding the branching quencher compound to the product (i.e., intermediate polycarbonate) of the melt polycondensation reaction produces finished polycarbonates with reduced branching species, thereby alleviating the problems noted in the prior art. The resulting polycarbonates exhibit high ductility and impact strength.

Preparation of polycarbonate compositions by melt polycondensation reaction is known in the art, for example from U.S. Pat. Nos. 5,717,057, 5,606,007, and 5,319,066, which are incorporated herein by reference.

As used herein, the terms "polycarbonate", "polycarbonate composition", and "composition comprising aromatic carbonate chain units" includes compositions having structural units of the formula (I):

in which at least about 60 percent of the total number of $R^1$ groups are aromatic organic radicals and the balance thereof are aliphatic, alicyclic, or aromatic radicals. Preferably, $R^1$ is an aromatic organic radical and, more preferably, a radical of the formula (II):

$$—A^1—Y^1—A^2— \quad (II)$$

wherein each of $A^1$ and $A^2$ is a monocyclic divalent aryl radical and $Y^1$ is a bridging radical having zero, one, or two atoms which separate $A^1$ from $A^2$. In an exemplary embodiment, one atom separates $A^1$ from $A^2$. Illustrative, non-limiting examples of radicals of this type are —O—, —S—, —S(O)—, —S(O$_2$)—, —C(O)—, methylene, cyclohexyl-methylene, 2-[2,2,1]-bicycloheptylidene, ethylidene, isopropylidene, neopentylidene, cyclohexylidene, cyclopentadecylidene, cyclododecylidene, adamantylidene, and the like. In another embodiment, zero atoms separate $A^1$ from $A^2$, with an illustrative example being biphenol (OH-benzene-benzene-OH). The bridging radical $Y^1$ can be a hydrocarbon group or a saturated hydrocarbon group such as methylene, cyclohexylidene or isopropylidene.

Polycarbonates can be produced by the reaction of dihydroxy compounds in which only one atom separates $A^1$ and $A^2$. As used herein, the term "dihydroxy compound" includes, for example, bisphenol compounds having general formula (III) as follows:

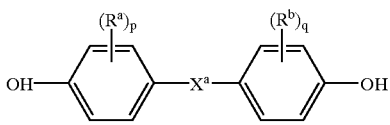

(III)

wherein $R^a$ and $R^b$ each independently represent hydrogen, a halogen atom, or a monovalent hydrocarbon group; p and q are each independently integers from 0 to 4; and $X^a$ represents one of the groups of formula (IV):

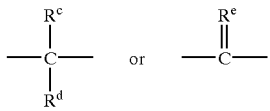

(IV)

wherein $R^c$ and $R^d$ each independently represent a hydrogen atom or a monovalent linear or cyclic hydrocarbon group, and $R^e$ is a divalent hydrocarbon group.

Some illustrative, non-limiting examples of suitable dihydroxy compounds include dihydric phenols and the dihydroxy-substituted aromatic hydrocarbons such as those disclosed by name or formula (generic or specific) in U.S. Pat. No. 4,217,438. A nonexclusive list of specific examples of the types of bisphenol compounds that may be represented by formula (III) includes the following: 1,1-bis (4-hydroxyphenyl) methane; 1,1-bis(4-hydroxyphenyl) ethane; 2,2-bis(4-hydroxyphenyl) propane (hereinafter "bisphenol A" or "BPA"); 2,2-bis(4-hydroxyphenyl) butane; 2,2-bis(4-hydroxyphenyl) octane; 1,1-bis(4-hydroxyphenyl) propane; 1,1-bis(4-hydroxyphenyl) n-butane; bis(4-hydroxyphenyl) phenylmethane; 2,2-bis(4-hydroxy-1-methylphenyl) propane; 1,1-bis(4-hydroxy-t-butylphenyl) propane; bis(hydroxyaryl) alkanes such as 2,2-bis(4-hydroxy-3-bromophenyl) propane; 1,1-bis(4-hydroxyphenyl) cyclopentane; 4,4"-biphenol; and bis (hydroxyaryl) cycloalkanes such as 1,1-bis(4-hydroxyphenyl) cyclohexane; and the like as well as combinations comprising at least one of the foregoing bisphenol compound.

It is also possible to employ polycarbonates resulting from the polymerization of two or more different dihydric phenols or a copolymer of a dihydric phenol with a glycol or with a hydroxy-or acid-terminated polyester or with a dibasic acid or with a hydroxy acid or with an aliphatic diacid in the event a carbonate copolymer rather than a homopolymer is desired for use. Generally, useful aliphatic diacids have about 2 to about 40 carbons.

While a preferred diaryl carbonate for use referred aliphatic diacid is dodecandioic acid. Polyarylates and polyester-carbonate resins or their blends can also be employed.

Preferred polycarbonates are based on bisphenol A, in which each of $A^1$ and $A^2$ is p-phenylene and $Y^1$ is isopropylidene. Preferably, the weight average molecular weight of the polycarbonate is about 5,000 to about 100,000 atomic mass units, more preferably about 10,000 to about 65,000 atomic mass units, and most preferably about 15,000 to about 35,000 atomic mass units, in the method of the invention is diphenylcarbonate, other diaryl carbonates may be used to make specialty polyearbenates. Various methods for synthesis of diaryl carbonates are known, for example from U.S. Pat. Nos. 5,210,268, 5,834,615, which are incorporated he by reference.

The polycarbonate composition may also include various additives ordinarily incorporated in resin compositions of this type. Such additives are, for example, fillers or reinforcing agents; heat stabilizers; antioxidants; light stabilizers; plasticizers; antistatic agents; mold releasing agents; additional resins; blowing agents; and the like, as well as combinations comprising at least one of the foregoing additives.

The melt polycondensation reaction generally takes place in a series of reactors. The diarylcarbonate and dihydric alcohol are first mixed in a reactor vessel. To this reactor vessel, a catalyst is added to form an intermediate polycarbonate. Catalysts used in the method of the present invention to form the intermediate composition are basic catalysts, such as alkali metal or alkaline earth metal compounds or nitrogen-containing basic compounds, which are effective to catalyze the production of polycarbonates by melt condensation of the diarylcarbonate and the dihydric phenol. Any of the known alkaline catalysts useful for this purpose may be employed.

Since the reaction is an equilibrium reaction, byproduct phenol is continuously removed from the reactors to ensure the desired or targeted molecular weight for the finished polycarbonate. For example, the molecular weight after the initial mixing of components, i.e., intermediate polycarbonate, may be about 5,000 to about 8,000 daltons. After removing byproduct phenol, the molecular weight of the polycarbonate can be increased to 15,000 to about 18,000 depending on the reaction conditions. In order to effectively remove byproduct phenol from the vessel, the finishing reaction preferably occurs at temperatures greater than about 260° C. More preferably, the temperature is in a range from about 270° C. to about 310° C. The pressure of the reaction is preferably reduced to a pressure less than about 0.8 torr. More preferably, the reactor is pressurized to a pressure within a range from about 0.2 to about 0.6 torr. In one embodiment, once the final polycarbonate target specifications have been reached, a quencher composition is added to completely neutralize or deactivate the alkaline catalyst and the mixture is then passed through an extruder or otherwise processed. In another embodiment, the quenching compound is added prior to finishing. That is, prior to heating and/or reducing the pressure to obtain finished polycarbonate with the targeted molecular weight.

Advantageously, it has been found that adding the branching quencher compound to the intermediate polycarbonate prior to or during finishing of the polycarbonate minimizes or prevents the formation of branched species without deleteriously affecting the polymerization reaction, e.g. target molecular weight. Preferably, the finished polycarbonate comprises less than 600 ppm branched species, with less than 75 ppm more preferred.

Advantageously, the quencher compounds employed to quench, i.e., deactivate or neutralize, the alkaline catalyst at the end of the reaction train can be used as an effective branching quencher compound to effectively minimize or prevent the formation of branching species in the finished polycarbonate. Preferably, the branching quencher compound generally comprises an acid ester or an acid compound that is effective for deactivating or neutralizing the alkaline catalyst. There is no particular limitation on the structure of the quencher. The quencher compounds used in the invention may be Lewis acid compounds, Bronsted acid compounds or ester of strong acids so long as they are capable of neutralizing the alkaline catalyst compounds used in the melt polycondensation reaction.

Examples of suitable Bronsted acid compounds include phosphoric acid, phosphorous acid, hypophosphorous acid, pyrophosphoric acid, poly-phosphoric acid, boric acid, hydrochloric acid, hydrobromic acid, sulfuric acid, sulfurous acid, adipic acid, azelaic acid, dodecanoic acid, L-ascorbic acid, aspartic acid, benzoic acid, benzoic anhydride, formic acid, acetic acid, citric acid, glutamic acid, salicyclic acid, nicotic acid, fumaric acid, maleic acid, oxalic acid, benzenesulfinic acid, toluenesulfinic acid, and sulfonic acids such as benzenesulfonic acid, p-toluenesulfonic acid, trifluoromethane sulfonic acid, naphthalene napthalene sulfonic acid, sulfonated polystyrene, and methyl acrylate-sulfonated styrene copolymer.

Examples of suitable esters of strong acids include compounds such as dimethyl sulfonate, triethyl ortho acetate, diethyl sulfonate, methyl, ethyl, butyl, octyl or phenyl ester of p-toluenesulfonic acid, and methyl, ethyl, butyl, octyl or phenyl ester of benzenesulfonic acid.

Other suitable transesterification quenchers include mono-, di-, and tri-hydrogen phosphites and their metal salts; mono-, di-, and tri-hydrogen phosphates and their metal salts; mono-and di-hydrogen phosphonates and their metal salts; pyrophosphates and their metal salts; mixtures comprising at least one of the foregoing quenchers; and the like.

The mono-, di-, and tri-hydrogen phosphites and their metal salts have the formula (V):

$$P(OR^1)_a(OM^{n+}{}_{1/n})_{3-a} \qquad (V)$$

wherein each $R^1$ is independently $C_1$–$C_{12}$ alkyl, $C_1$–$C_{12}$ aryl, or $C_1$–$C_{18}$ alkylaryl; each M is independently hydrogen or a metal atom selected from Group IA, IIA, IB, or IIB of the periodic table; a is 0–2; and n is 1 or 2. Preferred compounds in this class include phosphorous acid, $H_3PO_3$.

The mono-, di-, and tri-hydrogen phosphates and their metal salts have the formula (VI):

$$O{=}P(OR^1)_a(OM^{n+}{}_{1/n})_{3-a} \qquad (VI)$$

wherein $R_1$, M, a, and n are as defined for the phosphites above. Preferred compounds in this class include those in which a=0 and M is a metal atom selected from Group IB or IIB of the periodic table. A highly preferred compound is mono zinc phosphate (MZP; $ZnHPO_4$).

The mono-and di-hydrogen phosphonates and their metal salts have the formula (VII):

$$P(R^1)(OR^1)_b(OM^{n+}{}_{1/n})_{2-b} \qquad (VII)$$

wherein $R_1$, M, and n are defined as above, and b=0 or 1.

The pyrophosphates and their metal salts have the formula (VIII):

$$M'_xH_yP_4O_{34}{-}; \qquad (VIII)$$

wherein M is as defined for the phosphites above, x is 1–12, y is 1–12, q is 2–10, and z is 1–5, with the proviso that the sum (xz)+y is equal to q+2. M is preferably a Group IA or IIA metal. Preferred compounds in this class include $Na_3HP_2O_7$; $K_2H_2P_2O_7$; $KNaH_2P_2O_7$; and $Na_2H_2P_2O_7$. The particle size of the polyacid pyrophosphate should be less than 75 micrometers, preferably less than 50 micrometers and most preferably less than 20 micrometers.

These and other quenchers, including quencher mixtures, are described, for example, in U.S. Pat. Nos. 4,401,804 to Wooten et al., 4,532,290 tojaquiss et al., and 5,354,791 to Gallucci, 5,606,007 to Sakashita et al., 5,608,027 to Crosby et al., and 5,922,816 to Hamilton.

As mentioned above, the determination of how much of a particular quencher to be used may be readily determined by preparing the composition with and without the particular branching quencher compound and determining the effect on molecular weight, melt viscosity, gas generation or color stability or the formation of interpolymer. In a preferred embodiment, the quencher is an alkyl tosylate. More preferably, the quencher is n-butyl tosylate.

The amount of quencher in the quencher composition can be varied over a substantial range, since a carrier may be used as a diluent to facilitate uniform addition of small amounts of quencher to the product of the melt polycondensation reaction. Quencher compositions with higher concentrations of quencher can be used in smaller amounts, while quencher compositions with lower quencher concentrations are used in larger amounts to arrive at the same final levels of quencher. In general, the level of quencher in a branching quencher composition will be from about 0.01 to 10% by volume, preferably around 1%.

The amount of branching quencher compound used to reduce the levels of residual catalyst has been found to be dependent on the particular quencher employed. Preferably, the amount of branching quencher compound added to the polycarbonate is in an amount effective to prevent an increase in the amount of branching compounds during the heating and/or reduction of pressure in the reaction vessel. Further suppression of the reactivity of the catalyst in the finished polycarbonate by use of a quencher compound added after heating and/or reduction of pressure in the reaction vessel results in improved processing and residence stability.

EXAMPLE

In this example, diphenylcarbonate and bisphenol A were polymerized with sodium hydroxide catalyst to obtain an intermediate polycarbonate having a molecular weight ranging from 5,000 to 8,000 daltons. The amount of catalyst used in this reaction was $1 \times 10^{-6}$ mole/mole bisphenol A and is referred to as one equivalent for the purposes of determining the amount of branching quencher added. Except where indicated, the polycarbonate was then further processed in a mini- reactor operating at 300° C. The pressure within the reactor was stepwise reduced to 1 millibar and after 30 minutes a finished polycarbonate having a molecular weight ranging from 15,000 to 18,000 daltons was obtained. The relative change in branching species was monitored as a function of the equivalent amount of branching quencher (based on catalyst concentration) compound added to the melt polycarbonate. The results are shown in Table 1.

TABLE I

| Entry | Branching Quencher | Equivalents per mol catalyst | % Quenching Efficiency |
|---|---|---|---|
| 1* | finished polycarbonate no quencher added | — | 0 |
| 2* | unfinished polycarbonate no quencher added | — | 100 |
| 3 | Butyl tosylate | 0.5 | 51 |
| 4 | Butyl tosylate | 1.0 | 94 |
| 5 | Benzoic anhydride | 10.0 | 58 |
| 6 | Benzoic anhydride | 100.0 | 88 |
| 7 | Benzoic Acid | 10.0 | 65 |
| 8 | Triethyl ortho acetate | 10.0 | 58 |
| 9 | Tosylic acid | 0.5 | 67 |
| 10 | EPPS | 3.0 | 76 |

*control

The control entries, i.e., entries 1 and 2, contained no branching quencher. Entry 1 was finished polycarbonate whereas entry 2 is unfinished polycarbonate. As discussed above, the greatest amount of branching species is observed after finishing. Since polycarbonate finished without a branching quencher compound contains the greatest amount of branching species, the quenching efficiency was set to 0%. In contrast, the unfinished polycarbonate of entry 2 contains the least amount of branching species since it is not exposed to the harsh processing conditions during finishing. The % quenching efficiency for entry 2 was set at 100%. Entries 3–10 demonstrate the relative effectiveness for various branching quencher compounds and equivalent amounts added prior to finishing the polycarbonate. Polymerization and formation of cross-linking species (branching species) is clearly suppressed by the addition of the noted branching quenchers. However, it is noted that although the addition of 1 equivalent of n-butyl tosylate resulted in 94% quenching efficiency, the molecular weight target of 15,000–18,000 was not obtained. In all other entries, the target molecular weight was obtained. A careful balance between quenching efficiency and polymerization activity is required. Too much quenching compound added results in a reduction in polymerization activity.

While preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed herein are not to be construed as limiting to the claims.

What is claimed is:

1. A process for the production of a polycarbonate having reduced branching species, the process comprising:

melt polycondensing an aromatic dihydroxy compound and a diarylcarbonate in the presence of an alkaline catalyst in a reactor to produce an intermediate polycarbonate;

adding a branching quencher compound to the intermediate polycarbonate prior to finishing; and increasing a molecular weight of the intermediate polycarbonate to a targeted molecular weight by heating and/or reducing the pressure in the reactor to produce a finished polycarbonate, wherein the amount of branching quencher compound added to the intermediate polycarbonate is effective to reduce the amount of branching species generated during heating and/or reducing the pressure while allowing the targeted molecular weight to be achieved.

2. The process according to claim 1, wherein the amount of branching quencher compound added to the intermediate polycarbonate is effective to reduce the amount of branching species generated during heating and/or reducing the pressure by at least 50%.

3. The process according to claim 1, wherein the aromatic dihydroxy compound comprises bisphenol A and, wherein the diarylcarbonate comprises diphenyl carbonate.

4. The process according to claim 1, wherein the branching quencher compound comprises an acid ester compound.

5. The process according to claim 1, wherein the acid ester compound comprises an alkyl tosylate compound.

6. The process according to claim 1, wherein the alkyl tosylate compound is n-butyl tosylate.

7. The process according to claim 6, wherein about 0.5 equivalents of the n-butyl tosylate compound is added the intermediate polycarbonate to reduce the amount of branching species generated in the finished polycarbonate by at least 50%.

8. The process according to claim 1, wherein the branching quencher compound is selected from the group consisting of benzyl tosylate, benzoic anhydride, triethylorthoacetate, tosylic acid, and N-(2-hydroxyethyl)piperazine-N"-(3 propanesulfonic acid.

9. The process according to claim 1, wherein the branching quencher compound comprises an acid generating compound.

10. The process according to claim 1, wherein the molecular weight of the polycarbonate increases by at least 50% during heating and/or reducing the pressure in the reactor.

11. The process according to claim 1, wherein the molecular weight of the polycarbonate increases by at least 100% during heating and/or reducing the pressure in the reactor.

12. A process for the production of an aromatic polycarbonate having reduced branching species, the process comprising:

melt polycondensing an aromatic dihydroxy compound and a diarylcarbonate in the presence of an alkaline catalyst in a reactor to produce an intermediate polycarbonate;

adding a branching quencher compound to the intermediate polycarbonate prior to exposing the intermediate polycarbonate to a finishing process; and finishing the intermediate polycarbonate to produce a finished polycarbonate, wherein finishing comprises heating and/or reducing the pressure of the reactor to increase a molecular weight of the intermediate polycarbonate to a targeted molecular weight.

13. The process according to claim 12, wherein the branching quencher compound is selected from the group consisting of benzyl tosylate, benzoic anhydride, triethylorthoacetate, tosylic acid, and N-(2-hydroxyethyl)piperazine-N"-(3 propanesulfonic acid.

14. The process according to claim 12, wherein the finished polycarbonate comprises less than 600 ppm of a branched species.

15. The process according to claim 12, wherein the finished polycarbonate comprises less than 75 ppm of a branched species.

16. The process according to claim 12, wherein the finishing process comprises heating the intermediate polycarbonate to a temperature greater than about 260° C. and/or reducing the pressure to less than about 0.8 torr.

17. The process according to claim 12, wherein finishing the intermediate polycarbonate increases the molecular weight by at least 100%.

* * * * *